United States Patent
Kodama (10) Patent No.: US 12,314,202 B2
(45) Date of Patent: May 27, 2025

(54) VEHICLE-MOUNTED INFORMATION PROCESSING APPARATUS AND VEHICLE-MOUNTED INFORMATION PROCESSING METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Yuichi Kodama, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 18/256,809

(22) PCT Filed: Nov. 26, 2021

(86) PCT No.: PCT/JP2021/043334
§ 371 (c)(1),
(2) Date: Jun. 9, 2023

(87) PCT Pub. No.: WO2022/130932
PCT Pub. Date: Jun. 23, 2022

(65) Prior Publication Data
US 2024/0028538 A1  Jan. 25, 2024

(30) Foreign Application Priority Data
Dec. 15, 2020 (JP) ................ 2020-207608

(51) Int. Cl.
*G06F 13/38* (2006.01)

(52) U.S. Cl.
CPC .......... *G06F 13/38* (2013.01); *G06F 2213/40* (2013.01)

(58) Field of Classification Search
CPC ..................................... G06Q 20/02
See application file for complete search history.

(56) References Cited

U.S. PATENT DOCUMENTS

2017/0274897 A1* 9/2017 Rink .............. H04N 21/2187
2021/0049057 A1* 2/2021 Iida ..................... G06F 9/544

FOREIGN PATENT DOCUMENTS

JP  2018-013843 A  1/2018

OTHER PUBLICATIONS

International Search Report, Application No. PCT/JP2021/043334, mailed Feb. 8, 2022. ISA/Japan Patent Office.

* cited by examiner

*Primary Examiner* — Henry Tsai
*Assistant Examiner* — Juanito C Borromeo
(74) *Attorney, Agent, or Firm* — Honigman, LLP (57) ABSTRACT

A vehicle-mounted information processing apparatus is mounted in a vehicle and includes: a plurality of processing units that perform processing in parallel or pseudo-parallel; a shared storage unit that is accessible by the plurality of processing units; and a detection unit that detects an abnormality at the shared storage unit. The processing units each include a communication unit that performs communication via a communication line, and the plurality of processing units exchange information via the shared storage unit. When the detection unit has detected an abnormality at the shared storage unit, the processing units exchange information through communication using the communication units. The plurality of processing units and the shared storage unit may be integrated into a single integrated circuit, and information may be exchanged via a communication line outside the integrated circuit when the detection unit has detected an abnormality at the shared storage unit.

10 Claims, 7 Drawing Sheets

VEHICLE-MOUNTED INFORMATION PROCESSING APPARATUS AND VEHICLE-MOUNTED INFORMATION PROCESSING METHOD

CROSS-REFERENCE TO RELATED APPLICATIONS

This application is the U.S. national stage of PCT/JP2021/043334 filed on Nov. 26, 2021, which claims priority of Japanese Patent Application No. JP 2020-207608 filed on Dec. 15, 2020, the contents of which are incorporated herein.

TECHNICAL FIELD

The present disclosure relates to a vehicle-mounted information processing apparatus and a vehicle-mounted information processing method where information is exchanged between a plurality of processing units.

BACKGROUND

JP 2018-13843A discloses a multicore computing apparatus which is equipped with a first core, a second core, and a shared memory and is configured so that both cores communicate via the shared memory. In this multicore computing apparatus, the first core executes a behavior schedule application, which decides a behavior schedule indicating an order of changes in behavior of a vehicle driving transmission apparatus subjected to control, and the second core executes an actuator control application, which controls an actuator that operates the vehicle driving transmission apparatus, and a sensing application, which acquires and provides physical information.

There is demand for a vehicle-mounted information processing apparatus and a vehicle-mounted information processing method that enable a plurality of processing cores to communicate more stable than the technology disclosed in JP 2018-13843A.

The present disclosure was conceived in view of the situation described above and has an object of providing a vehicle-mounted information processing apparatus and a vehicle-mounted information processing method that enable communication between a plurality of processing units to be performed more stably.

SUMMARY

A vehicle-mounted information processing apparatus according to an aspect of the present disclosure is mounted in a vehicle and includes: a plurality of processing units that perform processing in parallel or pseudo-parallel; a shared storage unit that is accessible by the plurality of processing units; and a detection unit that detects an abnormality at the shared storage unit, wherein the processing units each include a communication unit that performs communication via a communication line, and the plurality of processing units exchange information via the shared storage unit, and exchange information through communication using the communication units when the detection unit has detected an abnormality at the shared storage unit.

The above aspect of the present disclosure can be realized not only as an apparatus including the characteristic control unit described above, but also as a method that has the characteristic processing in question as steps or as a computer program for causing a computer to execute such steps.

It is also possible to realize part or all of the apparatuses described above as a semiconductor integrated circuit or as another apparatus or system including the above apparatuses.

Advantageous Effects

With the configuration described above, there are high expectations that communication between a plurality of processing units will be performed more stably.

DETAILED DESCRIPTION OF PREFERRED EMBODIMENTS

Embodiments of the present disclosure will first be listed and described. At least some parts of the embodiments described below may be freely combined.

A vehicle-mounted information processing apparatus according to an aspect of the present disclosure is mounted in a vehicle and includes: a plurality of processing units that perform processing in parallel or pseudo-parallel; a shared storage unit that is accessible by the plurality of processing units; and a detection unit that detects an abnormality at the shared storage unit, wherein the processing units each include a communication unit that performs communication via a communication line, and the plurality of processing units exchange information via the shared storage unit, and exchange information through communication using the communication units when the detection unit has detected an abnormality at the shared storage unit.

According to this aspect, the vehicle-mounted information processing apparatus includes the plurality of processing units that perform processing in parallel or pseudo-parallel and the shared storage unit that is accessible by the plurality of processing units. The plurality of processing units exchange information via the shared storage unit. When an abnormality has been detected at the shared storage unit, the plurality of processing units exchange information through communication via a communication line. By doing so, even when an abnormality has occurred at the shared storage unit, there are high expectations that the plurality of processing units will be able to continue exchanging information through communication via a communication line.

It is preferable for the plurality of processing units and the shared storage unit to be integrated into a single integrated circuit and, when the detection unit has detected an abnormality at the shared storage unit, for information to be exchanged via a communication line outside the integrated circuit.

According to this aspect, the plurality of processing units and the shared storage unit are integrated into a single integrated circuit. By doing so, there are high expectations for miniaturization and the like of the vehicle-mounted information processing apparatus. In this vehicle-mounted information processing apparatus, when an abnormality has been detected at the shared storage unit, the plurality of processing units exchange information via a communication line provided outside the integrated circuit. By doing so, there is no need to provide a communication path for use in the event of an abnormality inside the integrated circuit, and when an abnormality has occurred at the shared storage unit, the plurality of processing units can exchange information using a communication path outside the integrated circuit.

It is preferable for the respective communication units of the plurality of processing units to be connected to a communication line provided outside the integrated circuit and to exchange information via the communication line.

According to this aspect, the communication units of the plurality of processing units are connected to a communication line provided outside the integrated circuit. When an abnormality has occurred at the shared storage unit, the plurality of processing units exchange information by communicating via the communication line outside the integrated circuit. By doing so, it is possible to exchange information between the plurality of processing units with a simple configuration that makes use of the communication units provided in each processing unit and connects the communication units with a communication line.

It is also preferable for the vehicle-mounted information processing apparatus to further include a communication integrated circuit for communicating with another apparatus, and for the respective communication units of the plurality of processing units to be connected via communication lines to the communication integrated circuit and to exchange information via the communication integrated circuit.

According to this aspect, the vehicle-mounted information processing apparatus includes a communication integrated circuit that communicates with other apparatuses. The communication units of the plurality of processing units are connected to the communication integrated circuit via communication lines. When an abnormality has occurred at the shared storage unit, the plurality of processing units exchange information via the communication integrated circuit. By doing so, it is possible to exchange information between a plurality of processing units using the communication integrated circuit provided on a communication path used when the processing units communicate with other apparatuses.

The communication integrated circuit is preferably a communication integrated circuit that communicates based on Ethernet communication protocol.

According to this aspect, the communication integrated circuit communicates according to Ethernet communication protocol. By doing so, there are high expectations that the vehicle-mounted information processing apparatus can realize safe and reliable exchanging of information between the plurality of processing units.

The communication integrated circuit is preferably a communication integrated circuit that communicates based on SPI (Serial Peripheral Interface) communication protocol.

According to this aspect, the communication integrated circuit communicates according to SPI communication protocol. A communication integrated circuit that communicates based on SPI communication protocol is often less costly than a communication integrated circuit that communicates based on CAN communication protocol or a communication integrated circuit that communicates based on Ethernet communication protocol. Due to this, there are high expectations that this vehicle-mounted information processing apparatus will be able to lower component costs and stably perform the transmission and reception of information between a plurality of processors.

It is preferable for the respective communication units of the plurality of processing units to be connected via communication lines to a relay apparatus outside the vehicle-mounted information processing apparatus and to exchange information via the relay apparatus.

According to this aspect, the communication units provided in each of the plurality of processing units are each connected to a relay apparatus outside the vehicle-mounted information processing apparatus via a communication line. When an abnormality has occurred at the shared storage unit, the plurality of processing units exchange information by communicating via the external relay apparatus. By doing so, there is no need to provide a communication path for use in the event of an abnormality inside the vehicle-mounted information processing apparatus, and when an abnormality has occurred at the shared storage unit, the plurality of processing units can exchange information using the external relay apparatus.

A vehicle-mounted information processing method according to an aspect of the present disclosure includes: exchanging, by a vehicle-mounted information processing apparatus including a plurality of processing units that perform processing in parallel or pseudo-parallel and a shared storage unit that is accessible by the plurality of processing units, information between the plurality of processing units via the shared storage unit; and exchanging information between the plurality of processing units through communication via a communication line when an abnormality has been detected at the shared storage unit.

According to this aspect of the present disclosure, in the same way as aspect (1), there are high expectations that the plurality of processing units will be able to continue exchanging information through communication via a communication line, even when an abnormality has occurred at the shared storage unit.

Specific configurations of vehicle-mounted information processing apparatuses according to embodiments of the present disclosure will now be described with reference to the attached drawings. The present disclosure is not limited to the illustrated configurations and is instead indicated by the range of the patent claims and intended to include all changes within the meaning and scope of the patent claims and their equivalents.

First Embodiment

Apparatus Configuration

Figure 1:
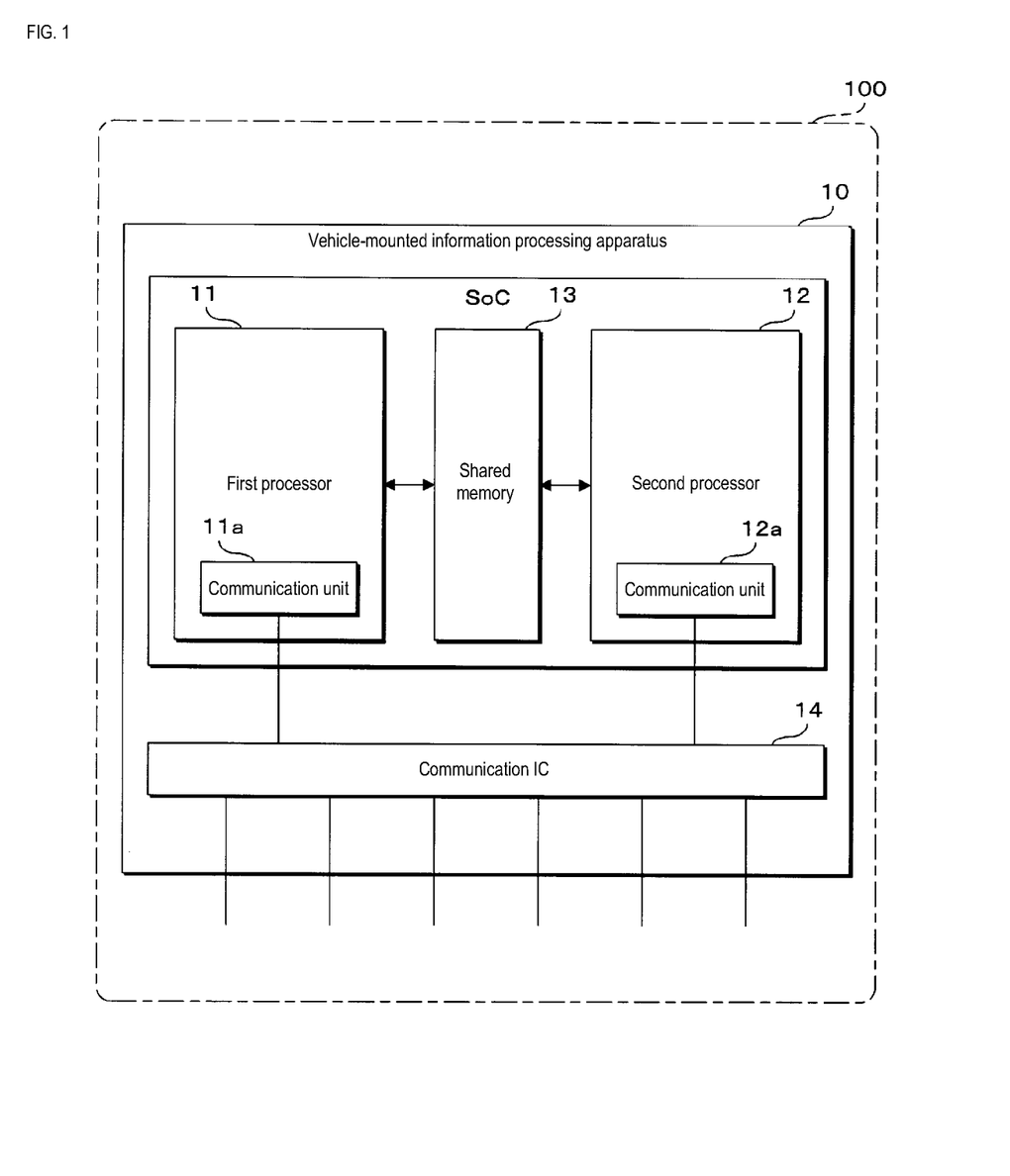
FIG. 1 is a block diagram depicting the configuration of a vehicle-mounted information processing apparatus according to a present embodiment.

FIG. 1 is a block diagram depicting the configuration of a vehicle-mounted information processing apparatus according to the present embodiment. A vehicle-mounted information processing apparatus 10 according to the present embodiment may take the form of various apparatuses, such as an electronic control unit (ECU) or a gateway (GW) mounted in a vehicle 100. The vehicle-mounted information processing apparatus 10 is equipped with a plurality of processing units that perform various computational processing by executing programs. As depicted in FIG. 1, the vehicle-mounted information processing apparatus 10 according to the present embodiment includes two processing units, a first processor 11 and a second processor 12.

Although not illustrated, the first processor 11 includes a computational processing apparatus, such as a CPU (Central Processing Unit) or an MPU (Micro Processing Unit), a storage apparatus such as SRAM (Static Random Access Memory) or DRAM (Dynamic Random Access Memory), an input/output interface that inputs and outputs signals, and the like. The first processor 11 also includes a communication unit 11a that communicates with apparatuses located outside the vehicle-mounted information processing apparatus 10 or the like based on a communication protocol such as Ethernet (registered trademark) or CAN (Controller Area Network).

In the same way, the second processor 12 includes a computational processing apparatus such as a CPU or an MPU, a storage apparatus such as SRAM or DRAM, an input/output interface that inputs and outputs signals, and the like. The second processor 12 also includes a communication unit 12a that communicates with apparatuses located outside the vehicle-mounted information processing apparatus 10 or the like based on a communication protocol such as Ethernet or CAN. Note that the first processor 11 and the second processor 12 do not need to be processors with the same functions, performance and processing speed, and may instead be processors with different functions, performance, processing speed, and the like.

The first processor 11 and the second processor 12 are capable of independently performing processing in parallel. The first processor 11 and the second processor 12 are capable of transferring data (information) through communication between the processors, and in the vehicle-mounted information processing apparatus 10 according to the present embodiment, the first processor 11 and the second processor 12 perform such inter-processor communication using a shared memory 13. As one example, transmission of data from the first processor 11 to the second processor 12 can be realized by the first processor 11 writing data into the shared memory 13 and the second processor 12 reading such data.

The shared memory 13 is configured using a memory element such as SRAM or DRAM. Note that the shared memory 13 may be configured using a non-volatile memory device, such as flash memory or EEPROM (Electrically Erasable Programmable Read Only Memory). The shared memory 13 is accessible (for data writes and data reads) by both the first processor 11 and the second processor 12. However, it is not necessary for the shared memory 13 to be simultaneously accessible by both the first processor 11 and the second processor 12.

In addition, in the vehicle-mounted information processing apparatus 10 according to the present embodiment, the first processor 11, the second processor 12, and the shared memory 13 described above are integrated into a single IC (Integrated Circuit) in a so-called SoC (System on Chip) configuration. Using a SoC configuration is expected to improve processing speed and facilitate miniaturization. However, the first processor 11, the second processor 12 and the shared memory 13 do not need to be integrated into a single chip. As alternative examples, a plurality of chips may be combined into a single package, a so-called SiP (System in a Package) configuration, or may be divided into a plurality of integrated circuits.

The communication unit 11a of the first processor 11 and the communication unit 12a of the second processor 12 communicate with other apparatuses based on Ethernet communication protocol, for example. The communication units 11a and 12a perform processing that transmits data by generating messages or data frames containing various data to be transmitted to other apparatuses and outputting the messages or data frames onto communication lines, and receives data transmitted from other apparatuses via the communication lines. In this embodiment, the communication units 11a and 12a are connected via communication lines to a communication IC (communication integrated circuit) 14 of the vehicle-mounted information processing apparatus 10. In the present embodiment, a SoC IC, which includes the first processor 11, the second processor 12, and the shared memory 13, and the communication IC 14 are mounted on a circuit board, and terminals of the SoC IC and the terminals of the communication IC 14 are electrically connected via communication lines provided as wiring patterns on the circuit board.

The communication IC 14 is connected via communication lines to the SoC IC, which includes the first processor 11, the second processor 12, and the shared memory 13, is also connected to apparatuses outside the vehicle-mounted information processing apparatus 10 via a communication line, and performs mediation over communication inside and outside the vehicle-mounted information processing apparatus 10. When the vehicle-mounted information processing apparatus 10 communicates based on a communication protocol such as Ethernet, the communication IC 14 may use an integrated circuit such as an Ethernet switch. When the vehicle-mounted information processing apparatus 10 communicates based on a communication protocol such as Ethernet, an integrated circuit such as an Ethernet switch may be used for the communication IC 14. As examples, the Ethernet switch is an L2SW (Layer 2 switch) or an L3SW (Layer 3 switch). The communication IC 14 is connected to a plurality of communication lines and performs mediation over the transmission and reception of data by appropriately transmitting data that has been received on one communication line from another communication line.

When the communication IC 14 is an integrated circuit that performs communication based on Ethernet communication protocol, as one example, the vehicle-mounted information processing apparatus 10 according to the present embodiment is capable of selectively using TCP (Transmission Control Protocol) or UDP (User Datagram Protocol) as a Layer 4 (transport layer) communication protocol in keeping with the importance of the data to be transmitted and received. As one example, the vehicle-mounted information processing apparatus 10 transmits and receives data of high importance using TCP communication protocol and transmits and receives data of low importance using UDP communication protocol. By selectively using such Layer 4 communication protocols, there are high expectations that the vehicle-mounted information processing apparatus 10 will be able to deliver important data correctly to the intended processor.

As one example, the importance of data may be decided according to ASIL (Automotive Safety Integrity Level) safety levels as defined in ISO 26262, which is a functional safety standard for the automotive industry. ASIL defines five safety levels named D, C, B, A, and QM in descending order of safety standards. As one example, it is possible to set data related to the safety levels D, C, and B as being of high importance and data related to the safety levels A and QM as being of low importance and switch between the TCP and UDP communication protocols.

If the vehicle-mounted information processing apparatus has three or more processors, when data is transmitted and receiving between the processors, IP addresses, MAC addresses, or the like can be used to specify the transmission destination of data for example. By doing so, the vehicle-mounted information processing apparatus can deliver data more reliably from a processor as the transmission source to another processor as the transmission destination.

When the communication IC 14 is an integrated circuit that performs communication based on Ethernet communication protocol, it is possible to transmit and receive encrypted data using SSL (Secure Sockets Layer) or TLS (Transport Layer Security). By using SSL or TLS, it is possible for data to be safely transmitted and received between a plurality of processors in the vehicle-mounted information processing apparatus 10.

Alternatively, the communication IC 14 may perform communication based on SPI communication protocol. Integrated circuits that communicate based on SPI communication protocol are often less costly than integrated circuits that communicate based on CAN communication protocol or integrated circuits that communicate based on Ethernet communication protocol. Accordingly, by using an integrated circuit that performs communication using SPI communication protocol as the communication IC 14, there are high expectations that the vehicle-mounted information processing apparatus 10 according to the present embodiment will be able to lower component costs and stably perform the transmission and reception of data between a plurality of processors.

In the vehicle-mounted information processing apparatus 10 according to the present embodiment, as described above, the first processor 11 and the second processor 12 perform processing in parallel and exchange data as necessary via the shared memory 13. By exchanging data between the first processor 11 and the second processor 12 via the shared memory 13 provided in the same integrated circuit, there are high expectations of high-speed data transfers. When an abnormality has occurred at the shared memory 13, there is the possibility that the first processor 11 and the second processor 12 will not be able to exchange data and that processing will not be able to continue. For this reason, in the vehicle-mounted information processing apparatus 10 according to the present embodiment, when the occurrence of an abnormality at the shared memory 13 has been detected, the first processor 11 and the second processor 12 exchange data via a communication path provided outside the integrated circuit in which these processors are integrated.

In the present embodiment, an abnormality at the shared memory 13 is detected based on whether a data write into the shared memory 13 has succeeded. As one example, the first processor 11 writes data to be transmitted to the second processor 12 into the shared memory 13, reads the data from the shared memory 13 after the write ends, and determines whether the read data matches the write data. The first processor 11 determines that a data write into the shared memory 13 has succeeded when the two data match. When the two data do not match, the first processor 11 determines that the data write failed and that an abnormality has occurred at the shared memory 13. However, it is also possible for the first processor 11 to attempt a data write into the shared memory 13 a plurality of times and then determine that an abnormality has occurred when every data write failed. Note that the same may apply when the second processor 12 transmits data to the first processor 11.

In the present embodiment, as a communication path provided outside the integrated circuit in which the first processor 11, the second processor 12, and the shared memory 13 are integrated, it is possible for the first processor 11 and the second processor 12 to exchange data via the communication IC 14. The first processor 11, which has detected that an abnormality has occurred at the shared memory 13, transmits a message including the data to be transmitted to the second processor 12 from the communication unit 11*a*. This message transmitted by the communication unit 11*a* is received via a communication line at the communication IC 14. In this message, the second processor 12 for example is set as the transmission destination, and therefore the communication IC 14 transmits the received message from a communication line connected to the communication unit 12*a* of the second processor 12, which is set as the transmission destination. The message transmitted by the communication IC 14 is received by the communication unit 12*a*, which makes it possible for the second processor 12 to perform processing based on the data included in the received message. Note that the same applies when the second processor 12 transmits data to the first processor 11.

Once an abnormality has been detected at the shared memory 13, the first processor 11 does not write data into the shared memory 13 when transmitting data to the second processor 12 and may instead transmit the data through communication by the communication unit 11*a* performed via the communication path outside the integrated circuit. However, even after an abnormality has been detected at the shared memory 13, it is also possible for the first processor 11 to transmit data to the second processor 12 by first performing a data write into the shared memory 13 and, if this data write fails, then transmitting data through communication by the communication unit 11*a* performed via the communication path outside the integrated circuit. Note that the same applies when the second processor 12 transmits data to the first processor 11.

Inter-Processor Communication Processing

Figure 2:
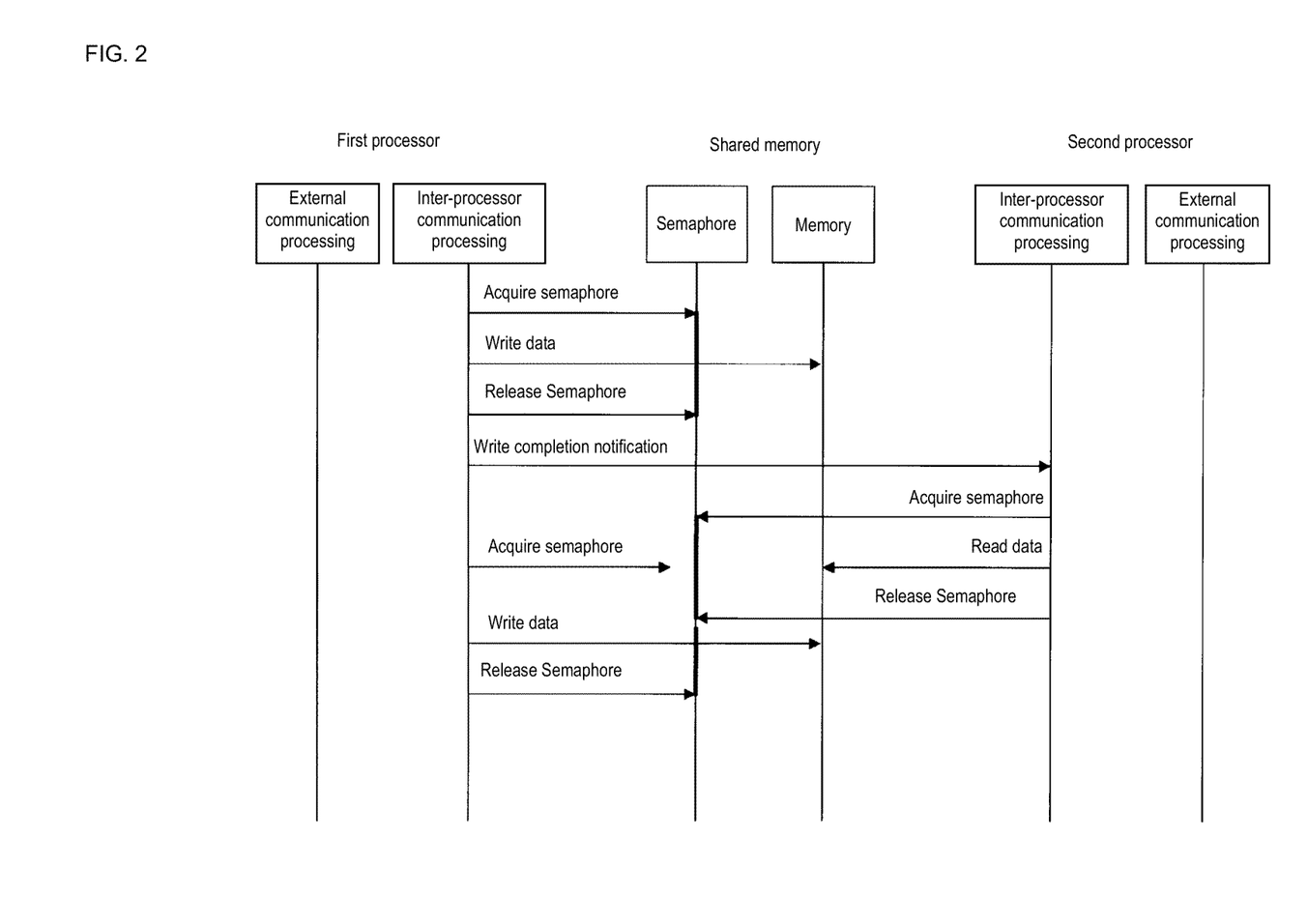
FIG. 2 is a schematic diagram useful in explaining communication between a first processor and a second processor of the vehicle-mounted information processing apparatus according to the present embodiment.
Figure 3:
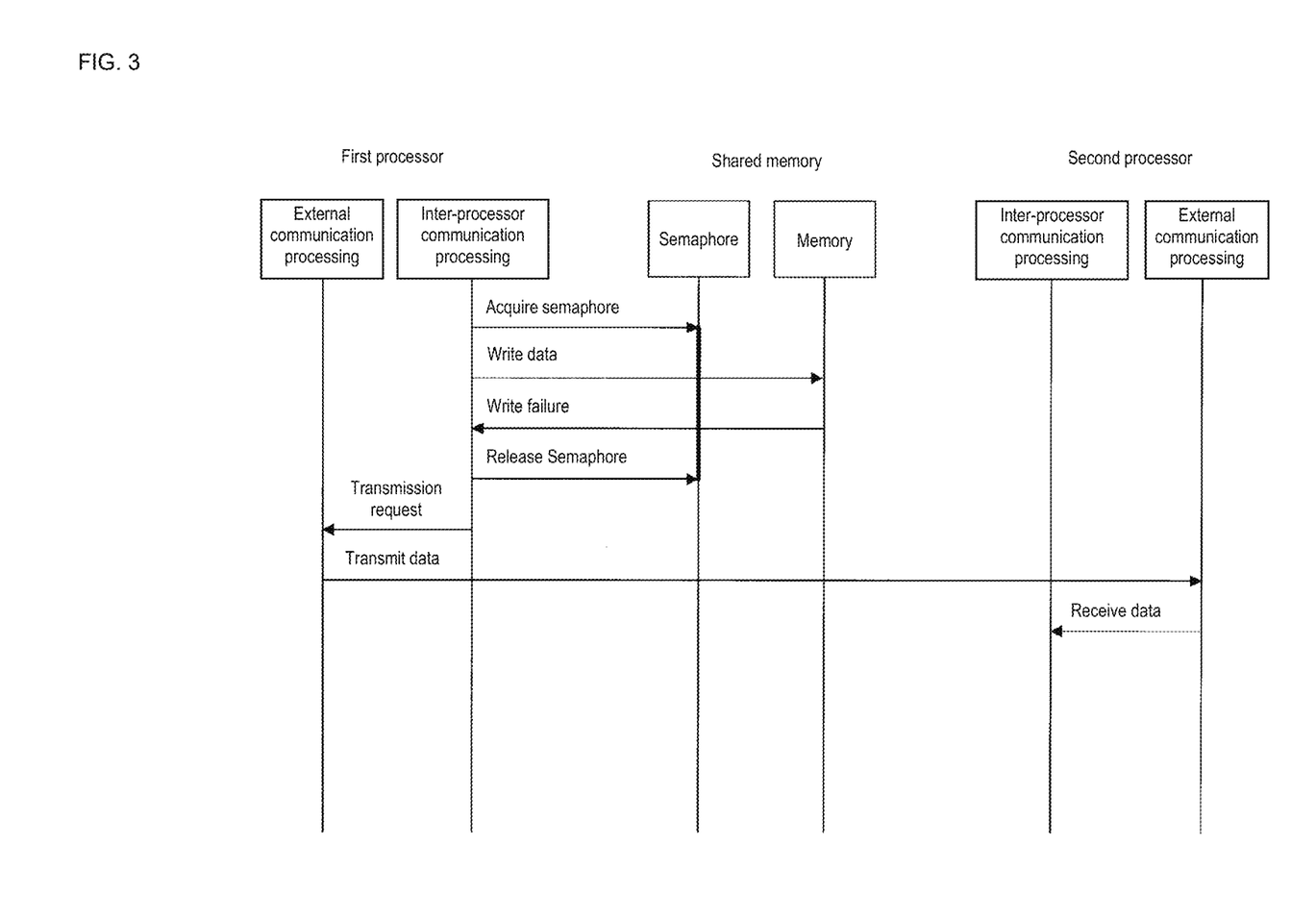
FIG. 3 is a schematic diagram useful in explaining communication between the first processor and the second processor of the vehicle-mounted information processing apparatus according to the present embodiment.

FIGS. 2 and 3 are schematic diagrams useful in explaining communication between the first processor 11 and the second processor 12 of the vehicle-mounted information processing apparatus 10 according to the present embodiment. The illustrated example depicts the flow when data is transmitted from the first processor 11 to the second processor 12, with FIG. 2 depicting the case where an abnormality has not occurred at the shared memory 13 and FIG. 3 depicting the case where an abnormality has occurred at the shared memory 13. FIGS. 2 and 3 depict the relationship between inter-processor communication processing (that is, communication using the shared memory 13) and an external communication processing (that is communication using a communication path outside the integrated circuit) performed by the first processor 11 and the second processor 12 and processing relating to semaphores (variables for exclusion control) and memory (storage of data) performed by the shared memory 13. The inter-processor communication processing and the external communication processing correspond to processes or tasks that run on the first processor 11 and the second processor 12.

Note that in the vehicle-mounted information processing apparatus 10 according to the present embodiment, exclusion processing (or "exclusive control" or "mutual exclusion") for restricting simultaneous access by the first processor 11 and the second processor 12 to the shared memory 13 is performed. Although semaphores are used for exclusion processing in the present embodiment, exclusion processing is not limited to this, and as examples, a monitor, mutex, or the like may be used for exclusion processing. Note that the semaphore may be implemented by any hardware or software.

As depicted in FIG. 2, when the first processor 11 needs to transmit data to the second processor 12 through inter-processor communication, the first processor 11 first acquires a semaphore corresponding to access rights to the shared memory 13. If the acquisition of a semaphore has succeeded, the first processor 11 performs a data write into a storage area indicated by a desired address in the shared memory 13. After successfully performing a normal data write, the first processor 11 releases the semaphore and notifies the second processor 12 of the completion of the data write.

The second processor 12 that has received the data write completion notification from the first processor 11 via interrupt processing, for example, acquires a semaphore in order to access the shared memory 13. If the acquisition of a semaphore has succeeded, the second processor 12 reads the data written by the first processor 11 from the shared memory 13 and then releases the semaphore. After reading the data from the shared memory 13, the second processor 12 can execute processing using the read data.

Note that after the second processor 12 has acquired a semaphore, if the first processor 11 were to attempt to acquire a semaphore to write data, for example, since the second processor 12 has already acquired the semaphore, the first processor 11 would not be able to acquire the semaphore and would instead stand by until the semaphore is released. After this, the second processor 12 releases the semaphore so that the first processor 11 can acquire the semaphore and can perform a data write into the shared memory 13. The first processor 11 releases the semaphore after completing the data write.

As depicted in FIG. 3, the first processor 11 acquires the semaphore and performs a data write into the shared memory 13. When the write has failed, the first processor 11 in the present embodiment releases the semaphore. After this, the first processor 11 transmits the data for which the data write failed to the second processor 12 via an external communication path. At this time, at the first processor 11, a data transmission request is given from a process in the inter-processor communication processing to a process in the external communication processing, and in response to this transmission request, a process in the external communication process transmits data using the communication unit 11*a* to the second processor 12 via an external communication path (that is, a communication line and the communication paths of the communication IC 14).

The data transmitted from the first processor 11 via the external communication path is received by the second processor 12. At this time, at the second processor 12, a process in the external communication processing acquires the data received by the communication unit 12*a* and performs processing that gives the acquired data to a process in the inter-processor communication process. The second processor 12 is capable of performing processing using this data received via the external communication path.

Flowcharts

Figure 4:
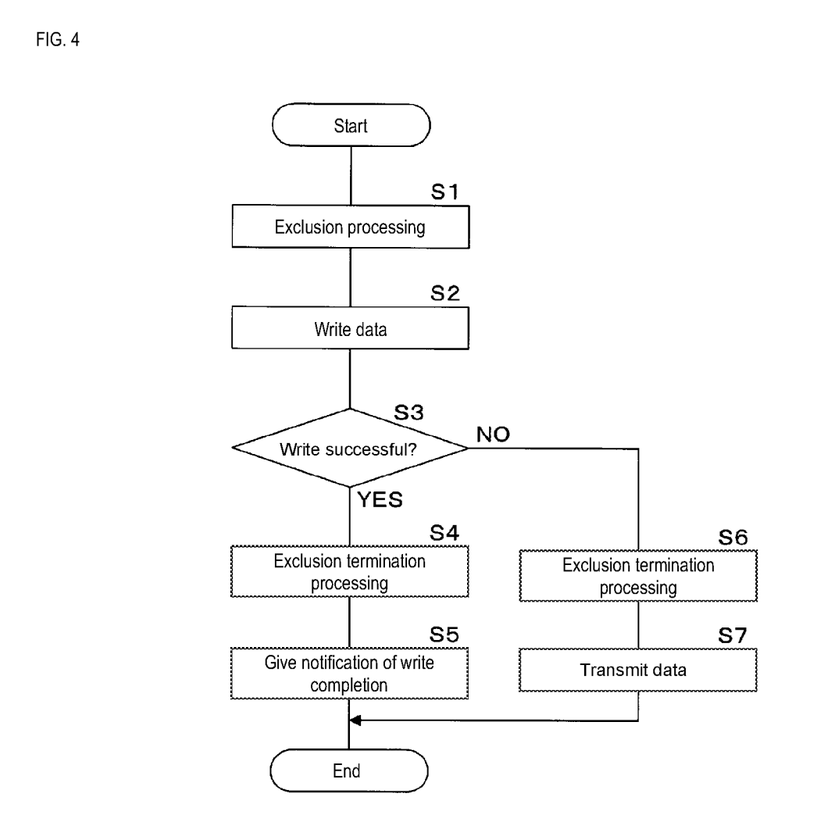
FIG. 4 is a flowchart depicting a data transmission procedure during inter-processor communication performed by the vehicle-mounted information processing apparatus according to the present embodiment.

FIG. 4 is a flowchart depicting a data transmission procedure during inter-processor communication performed by the vehicle-mounted information processing apparatus 10 according to the present embodiment. Note that although the first processor 11 performs data transmission processing in the following description, the same procedure may be used when the second processor 12 performs data transmission processing. When it has become necessary to transmit data to the second processor 12, the first processor 11 of the vehicle-mounted information processing apparatus 10 according to the present embodiment performs exclusion processing to restrict access by the second processor 12 to the shared memory 13 (step S1). When a semaphore is used for the exclusion processing, the exclusion processing in step S1 corresponds to processing that acquires the semaphore.

Next, the first processor 11 performs a data write into the shared memory 13 (step S2). As one example, the first processor 11 reads the written data and compares the data to determine whether the data write was successful (step S3). If the data write was successful (S3: YES), the first processor 11 performs an exclusion termination process to release the restriction on access to the shared memory 13 (step S4). When a semaphore is used for the exclusion processing, the exclusion termination processing in step S4 corresponds to processing for releasing the semaphore. After this, the first processor 11 notifies the second processor 12 of the completion of the data write into the shared memory 13 (step S5), and ends the processing.

If the data write has failed (S3: NO), the first processor 11 performs the exclusion termination processing to release the restriction on access to the shared memory 13 (step S6). After this, the first processor 11 transmits data to the second processor 12 through communication by the communication unit 11*a* via the communication IC 14 (step S7), and ends the processing.

Figure 5:
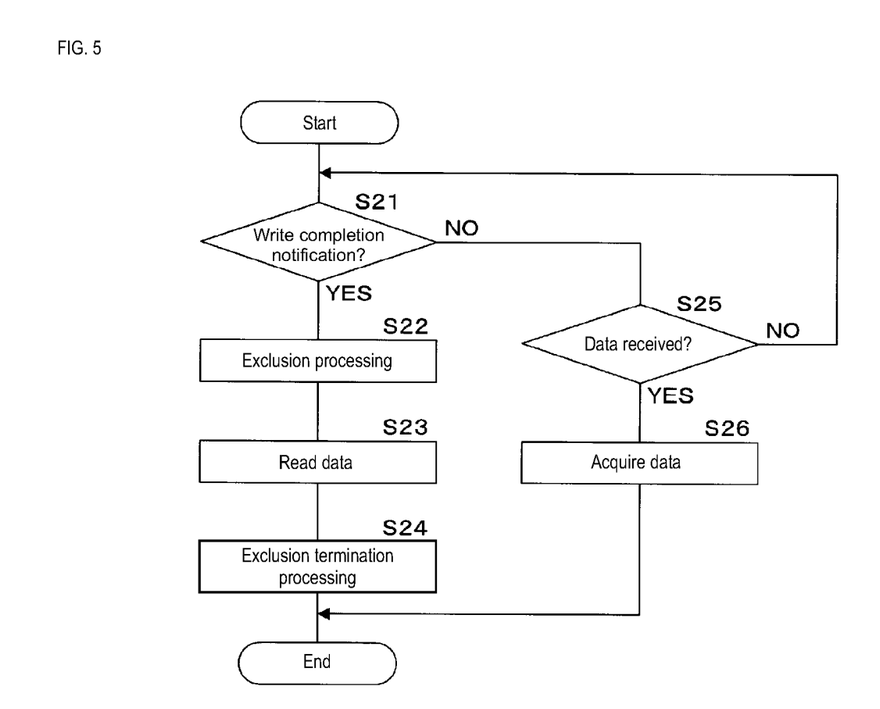
FIG. 5 is a flowchart depicting a data reception procedure during inter processor communication performed by the vehicle-mounted information processing apparatus according to the present embodiment.

FIG. 5 is a flowchart depicting a data reception procedure during inter-processor communication performed by the vehicle-mounted information processing apparatus 10 according to the present embodiment. Note that although the second processor 12 is described as performing the data reception processing in the following description, the same procedure may be used when the first processor 11 performs data reception processing. The second processor 12 of the vehicle-mounted information processing apparatus 10 according to the present embodiment determines whether notification of completion of a data write into the shared memory 13 has been received from the first processor 11 (step S21).

When notification of a write completion has been received from the first processor 11 (S21: YES), the second processor 12 performs exclusion processing to restrict access by the first processor 11 to the shared memory 13 (step S22). After this, the second processor 12 reads the data written by the first processor 11 from the shared memory 13 (step S23). At this time, as examples, the address in the shared memory 13 from which the second processor 12 reads data may be provided from the first processor 11 together with the notification of the write completion or may be an address that is set in advance. After reading the data, the second processor 12 performs the exclusion termination processing to release the restriction on access to the shared memory 13 (step S24), and ends the processing.

If notification of a write completion has not been received (S21: NO), the second processor 12 determines whether the communication unit 12a has received data from the first processor 11 via the communication path provided outside the integrated circuit (step S25). If the communication unit 12a has not received data (S25: NO), the processing by the second processor 12 returns to step S21. When data has been received from the first processor 11 (S25: YES), the second processor 12 acquires the data from the first processor 11 that was received by the communication unit 12a (step S26) and ends the processing.

Review

The vehicle-mounted information processing apparatus 10 according to the present embodiment with the configuration described above includes the first processor 11 and the second processor 12 that perform processing in parallel, and a shared memory 13 that is accessible by the plurality of processors. The first processor 11 and the second processor 12 exchange data via the shared memory 13. When an abnormality has been detected at the shared memory 13, the first processor 11 and the second processor 12 exchange data by communication via a communication line. By doing so, even when an abnormality has occurred at the shared memory 13, there are high expectations that the first processor 11 and the second processor 12 will be able to continue exchanging data through communication via the communication line.

Also in the vehicle-mounted information processing apparatus 10 according to the present embodiment, the first processor 11, the second processor 12 and the shared memory 13 are integrated in a single integrated circuit. By doing so, there are high expectations for miniaturization and the like of the vehicle-mounted information processing apparatus 10. Also with this vehicle-mounted information processing apparatus 10, when an abnormality has been detected at the shared memory 13, the first processor 11 and the second processor 12 will exchange data via a communication path provided outside the integrated circuit. By doing so, there is no need to provide a communication path for use in the event of an abnormality within the integrated circuit, and when an abnormality has occurred at the shared memory 13, it is possible for the first processor 11 and the second processor 12 to exchange data using a communication path outside the integrated circuit.

The vehicle-mounted information processing apparatus 10 according to the present embodiment also includes the communication IC 14 that communicates with other apparatuses. The communication unit 11a of the first processor 11 and the communication unit 12a of the second processor 12 are connected to the communication IC 14 via communication lines. When an abnormality has occurred at the shared memory 13, the first processor 11 and the second processor 12 exchange data via the communication IC 14. By doing so, the exchanging of data by the first processor 11 and the second processor 12 can be realized using the communication IC 14 provided on a communication path used by the first processor 11 and the second processor 12 to communicate with other apparatuses.

Note that the processing performed by the first processor 11 and the second processor 12 according to the present embodiment may be performed by an application program running on the first processor 11 and the second processor 12, may be performed by a system program such as an OS (Operating System), or may be performed by hardware. Note also that the "communication lines" in the present embodiment include wiring formed as patterns on a circuit board.

Second Embodiment

Figure 6:
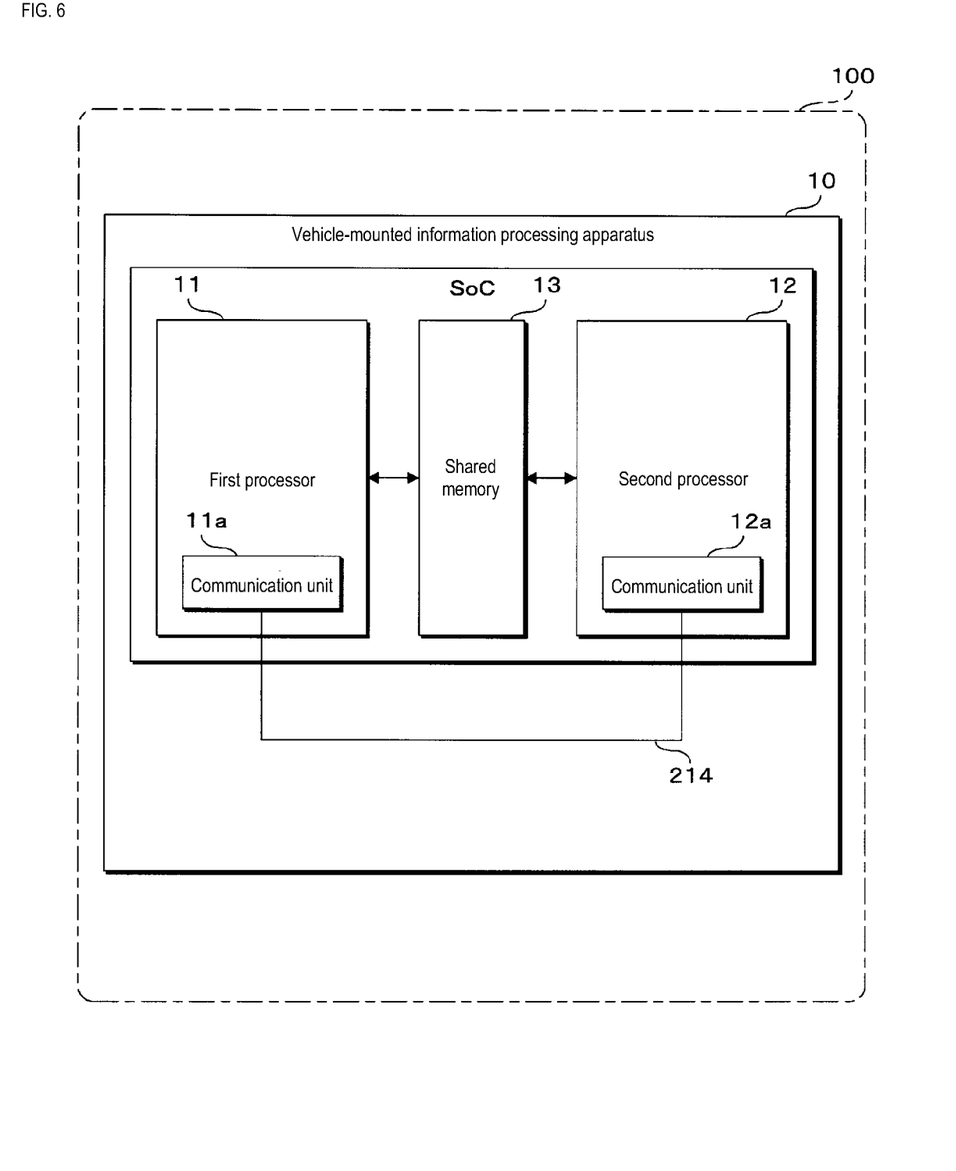
FIG. 6 is a block diagram depicting the configuration of a vehicle-mounted information processing apparatus according to a second embodiment.

FIG. 6 is a block diagram depicting the configuration of a vehicle-mounted information processing apparatus 10 according to the second embodiment. In the vehicle-mounted information processing apparatus 10 according to the second embodiment, the communication unit 11a of the first processor 11 and the communication unit 12a of the second processor 12, which are integrated into a single integrated circuit, are directly connected via a communication line 214 provided outside the integrated circuit. As one example, an IC terminal for connecting the communication unit 11a to the communication line and an IC terminal for connecting the communication unit 12a to the communication line may be electrically connected to a wiring pattern provided on a circuit board on which the integrated circuit is mounted. By doing so, the communication unit 11a of the first processor 11 and the communication unit 12a of the second processor 12 are able to communicate directly via the communication line 214.

In the vehicle-mounted information processing apparatus 10 according to the second embodiment, the first processor 11 and the second processor 12 exchange data via the shared memory 13. As one example, when an abnormality has occurred at the shared memory 13, such as when a data write into the shared memory 13 has failed, the first processor 11 and the second processor 12 exchange data by communicating via the communication line 214 using the communication units 11a and 12a. Various communication protocols, such as Ethernet, CAN, LIN (Local Interconnect Network), or SPI, can be used for the communication performed by the communication units 11a and 12a via the communication line 214.

In the vehicle-mounted information processing apparatus 10 according to the second embodiment with the configuration described above, the communication unit 11a of the first processor 11 and the communication unit 12a of the second processor 12 are connected to the communication line 214 provided outside the integrated circuit. When an abnormality has occurred at the shared memory 13, the first processor 11 and the second processor 12 exchange data by communicating via the communication line 214 outside the integrated circuit. By doing so, it is possible to realize the exchanging of data between the first processor 11 and the second processor 12 by way of a simple configuration that makes use of the communication unit 11a and the communication unit 12a provided in the first processor 11 and the second processor 12 and such communication unit 11a and communication unit 12a are connected by the communication line 214.

Since the other configurations of the vehicle-mounted information processing apparatus 10 according to the second embodiment are the same as those of the vehicle-mounted information processing apparatus 10 according to the first embodiment, the same reference numerals have been assigned to the same parts and detailed description thereof is omitted.

Third Embodiment

Figure 7:
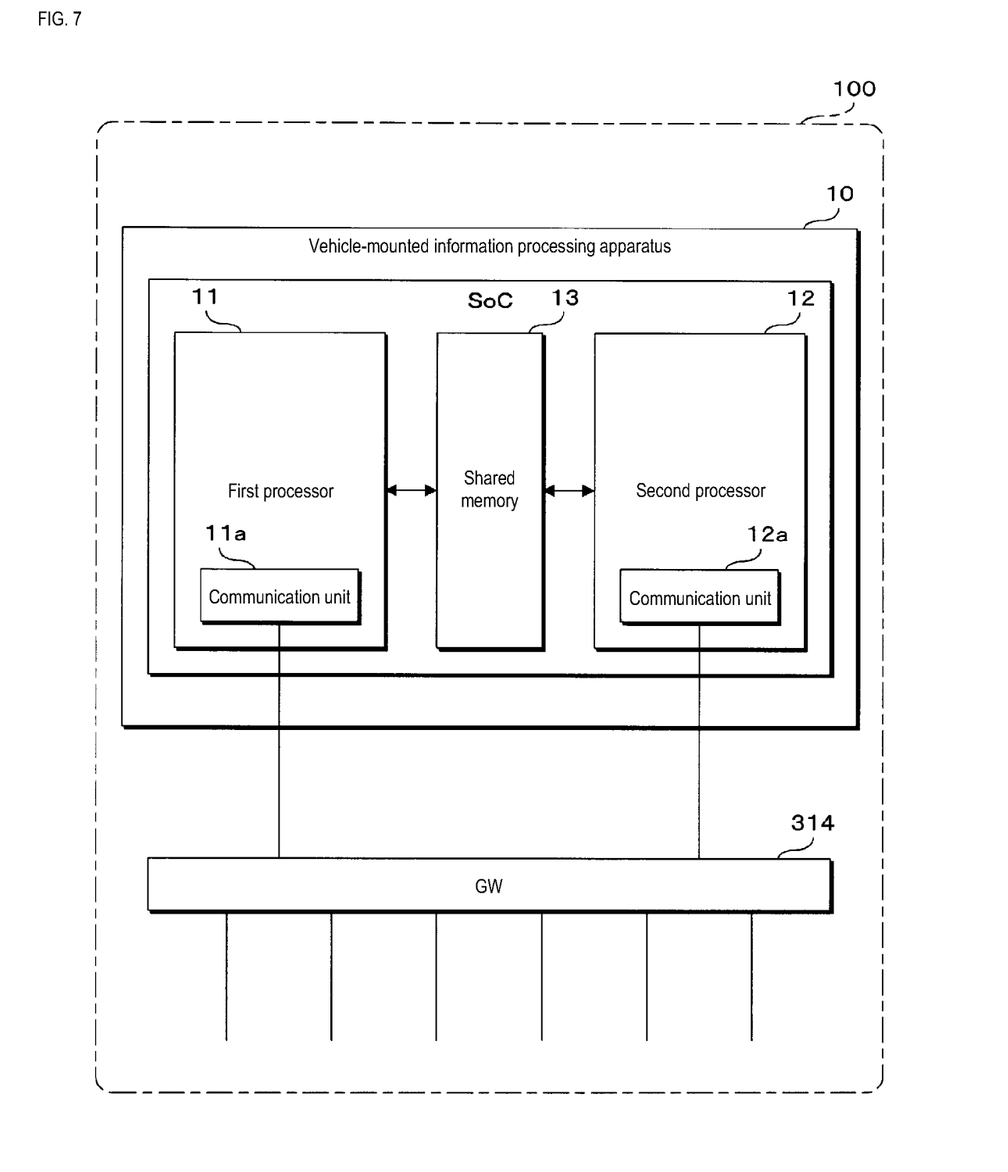
FIG. 7 is a block diagram depicting the configuration of a vehicle-mounted information processing apparatus according to a third embodiment.

FIG. 7 is a block diagram depicting the configuration of a vehicle-mounted information processing apparatus 10 according to the third embodiment. In the vehicle-mounted information processing apparatus 10 according to the third embodiment, the communication unit 11a of the first processor 11 and the communication unit 12a of the second processor 12 are connected via separate communication lines to a GW (gateway) 314 provided outside the vehicle-mounted information processing apparatus 10. The GW 314 is provided at a suitable location in the vehicle 100 separately to the vehicle-mounted information processing apparatus 10. The GW 314 is an apparatus to which a plurality of communication lines are connected and which performs processing to relay communication between such plurality of communication lines.

In the vehicle-mounted information processing apparatus 10 according to the third embodiment, the first processor 11 and the second processor 12 exchange data via the shared memory 13. When an abnormality has occurred at the shared memory 13, such as when a data write into the shared memory 13 has failed, the first processor 11 and the second processor 12 exchange data by communicating via the GW 314 using the communication unit 11a and the communication unit 12a.

When this happens, as one example, the first processor 11 transmits data to the GW 314 from the communication unit 11a. The GW 314 relays the data received from the communication unit 11a to transmit the data to the communication unit 12a. The second processor 12 receives the data transmitted from the GW 314 and performs processing based on the received data. The same also applies when data is transmitted from the second processor 12 to the first processor 11.

In the vehicle-mounted information processing apparatus 10 according to the third embodiment with the configuration described above, the communication unit 11a of the first processor 11 and the communication unit 12a of the second processor 12 are both connected via communication lines to the GW 314 provided outside the vehicle-mounted information processing apparatus 10. When an abnormality has occurred at the shared memory 13, the first processor 11 and the second processor 12 exchange data by communicating via the external GW 314 using the communication unit 11a and the communication unit 12a. By doing so, there is no need to provide a communication path for use in the event of an abnormality inside the vehicle-mounted information processing apparatus 10, and when an abnormality has occurred at the shared memory 13, it is possible for the first processor 11 and the second processor 12 to exchange data using the external GW 314.

Note that although the GW 314 has been given as an example of an external apparatus that relays the communication between the communication unit 11a of the first processor 11 and the communication unit 12a of the second processor 12 in this third embodiment, the external apparatus is not limited to the GW 314 and may be an apparatus like an Ethernet switch or any other apparatus for example. It is also possible for the communication between the communication unit 11a of the first processor 11 and the communication unit 12a of the second processor 12 to be relayed by a plurality of external apparatuses.

Since other configurations of the vehicle-mounted information processing apparatus according to the third embodiment are the same as those of the vehicle-mounted information processing apparatus according to the first embodiment, parts that are the same have been assigned the same reference numerals and detailed description thereof is omitted.

A vehicle-mounted information processing apparatus is equipped with a computer including a microprocessor, a ROM, a RAM, and the like. A computational processing unit such as a microprocessor may read out and execute a computer program, which includes part or all of the steps in the sequence diagrams or flowcharts given in FIGS. 2 to 5, from a storage unit such as a ROM or RAM. Computer programs for this plurality of apparatuses can be installed from an external server apparatus or the like. It is also possible to distribute these computer programs in a state where the programs have been stored on a recording medium such as a CD-ROM, a DVD-ROM, or a semiconductor memory.

All features of the embodiments disclosed here are exemplary and should not be regarded as limitations on the present disclosure. The scope of the present disclosure is indicated by the range of the patent claims, not the description given above, and is intended to include all changes within the meaning and scope of the patent claims and their equivalents.

The invention claimed is:

1. A vehicle-mounted information processing apparatus that is mounted in a vehicle and comprises:
    a plurality of processing units that perform processing in parallel or pseudo-parallel;
    a shared storage unit that is accessible by the plurality of processing units; and
    a detection unit that detects an abnormality at the shared storage unit,
    wherein the processing units each include a communication unit that performs communication via a communication line, and
    the plurality of processing units exchange information with each other based upon the detection of the detection unit, wherein when no abnormality is detected at the shared storage unit the plurality of processing units exchange information via the shared storage unit, and when the detection unit has detected an abnormality at the shared storage unit the plurality of processing units bypass the shared storage unit and exchange information through the communication line using the communication units.

2. The vehicle-mounted information processing apparatus according to claim 1, wherein the plurality of processing units and the shared storage unit are integrated into a single integrated circuit, and when the detection unit has detected an abnormality at the shared storage unit, information is exchanged via a communication line outside the integrated circuit.

3. The vehicle-mounted information processing apparatus according to claim 2, wherein the respective communication units of the plurality of processing units are connected to a communication line provided outside the integrated circuit and exchange information via the communication line.

4. The vehicle-mounted information processing apparatus according to claim 1, further including a communication integrated circuit for communicating with another apparatus, wherein the respective communication units of the plurality of processing units are connected via communication lines to the communication integrated circuit and exchange information via the communication integrated circuit.

5. The vehicle-mounted information processing apparatus according to claim 4, wherein the communication integrated circuit is a communication integrated circuit that communicates based on Ethernet communication protocol.

6. The vehicle-mounted information processing apparatus according to claim 4, wherein the communication integrated circuit is a communication integrated circuit that communicates based on SPI (Serial Peripheral Interface) communication protocol.

7. The vehicle-mounted information processing apparatus according to claim 1, wherein the respective communication units of the plurality of processing units are connected via communication lines to a relay apparatus outside the vehicle-mounted information processing apparatus and exchange information via the relay apparatus.

8. A vehicle-mounted information processing method comprising:
   determining an abnormality at a shared storage unit;
   exchanging, by a vehicle-mounted information processing apparatus including a plurality of processing units, each of the plurality of processing units including a communication unit connected to each other along a communication line, the plurality of processing units performing processing in parallel or pseudo-parallel and the shared storage unit that is accessible by the plurality of processing units, wherein information between the plurality of processing units are transmitted to each other via the shared storage unit when an abnormality has not detected; and
   exchanging information between the plurality of processing units using the communication units via the communication line when an abnormality has been detected at the shared storage unit.

9. The vehicle-mounted information processing apparatus according to claim 2, further including a communication integrated circuit for communicating with another apparatus,
   wherein the respective communication units of the plurality of processing units are connected via communication lines to the communication integrated circuit and exchange information via the communication integrated circuit.

10. The vehicle-mounted information processing apparatus according to claim 2, wherein the respective communication units of the plurality of processing units are connected via communication lines to a relay apparatus outside the vehicle-mounted information processing apparatus and exchange information via the relay apparatus.

* * * * *